(12) United States Patent
Roy et al.

(10) Patent No.: US 7,542,957 B2
(45) Date of Patent: Jun. 2, 2009

(54) RICH WEB APPLICATION INPUT VALIDATION

(75) Inventors: Patrick Roy, Gatineau (CA); Matt Masson, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 488 days.

(21) Appl. No.: 11/187,268

(22) Filed: Jul. 22, 2005

(65) Prior Publication Data
US 2007/0022119 A1 Jan. 25, 2007

(51) Int. Cl.
*G06F 17/00* (2006.01)
*G06N 5/02* (2006.01)

(52) U.S. Cl. ....................................... 706/47
(58) Field of Classification Search .................. None
See application file for complete search history.

(56) References Cited

U.S. PATENT DOCUMENTS

| | | | | |
|---|---|---|---|---|
| 6,311,194 B1 * | 10/2001 | Sheth et al. | ................. | 715/236 |
| 6,826,695 B1 * | 11/2004 | House et al. | ................... | 726/3 |
| 6,874,025 B2 * | 3/2005 | Hoogenboom et al. | ...... | 709/225 |
| 6,915,454 B1 * | 7/2005 | Moore et al. | .................. | 714/38 |
| 7,143,111 B2 * | 11/2006 | Yamada | ................... | 707/104.1 |
| 7,165,249 B2 * | 1/2007 | Potter et al. | ................. | 717/174 |
| 7,203,928 B2 * | 4/2007 | Mandava et al. | ............ | 717/124 |
| 7,254,581 B2 * | 8/2007 | Johnson et al. | ............. | 707/100 |
| 7,290,288 B2 * | 10/2007 | Gregg et al. | .................. | 726/28 |
| 7,296,297 B2 * | 11/2007 | Kirkpatrick et al. | ........... | 726/30 |
| 7,340,714 B2 * | 3/2008 | Upton | ........................ | 717/102 |
| 7,366,892 B2 * | 4/2008 | Spaur et al. | ................. | 713/151 |
| 7,424,616 B1 * | 9/2008 | Brandenburg et al. | ....... | 713/176 |
| 7,451,352 B1 * | 11/2008 | Moore et al. | .................. | 714/38 |
| 7,472,413 B1 * | 12/2008 | Mowshowitz | ................ | 726/10 |
| 2003/0037236 A1 | 2/2003 | Simon et al. | | |
| 2004/0189708 A1 | 9/2004 | Larcheveque et al. | | |
| 2005/0125438 A1 * | 6/2005 | Krishnaswamy et al. | .... | 707/102 |
| 2005/0228984 A1 | 10/2005 | Edery et al. | | |

OTHER PUBLICATIONS

Warnings for Disjoint Knowledge Omission in Ontologies Qadir, M.A.; Noshairwan, W.; Internet and Web Applications and Services, 2007. ICIW '07. Second International Conference on May 13-19, 2007 pp. 45-45 Digital Object Identifier 10.1109/ICIW.2007.69.*
CERT®, "Understanding Malicious Content Mitigation for Web Developers", CERT® Coordination Center, Feb. 2000, http://www.cert.org/tech_tips/m-alicious_code_mitigation.html and http://www.cert.org/tech_tips/malicious_-code_FAQ.html, pp. 1-9.

(Continued)

*Primary Examiner*—Michael B Holmes
(74) *Attorney, Agent, or Firm*—Samuel K. Simpson; Patent Ingenuity, P.C.

(57) ABSTRACT

Method to build rich input validation rules to address values not previously validated by type based rules or regular expressions available in current validation engines. These new validation rules have a rich set of ordered validation rule primitives (VRPs) with acceptance VRP or rejection VRP, thus the new validation rules have capabilities to handle complex data values. Also disclosed is method to build a validation rule applied to data elements defined using a Perl regular expression.

31 Claims, 5 Drawing Sheets

OTHER PUBLICATIONS

CERT®, "CERT® Advisory CA-2000-02 Malicious HTML Tags Embedded in Client Web Requests", CERT® Coordination Center, Feb. 2000, http://www.cert.org/advisories/CA-20-00-02.html, pp. 1-7.

Struts, The Apache Software Foundation, 2000-2004, http://struts.apache.org/userGuide/dev_validator.html, pp. 1-18.

"A survey of Trust in Internet Applications"; Gradison et al.; IEEE Communications Surveys and Tutorials, Fourth Quarter 2000; Jan. 24, 2001; [http://www.comsoc.org/pubs/surveys/] [Section 6.4], pp. 1-28.

"Specifying and Enforcing Application-Level Web Security Policies"; Scott et al. IEEE Transactions on Knowledge and Data Engineering, vol. 15, No. 4, Jul./Aug. 2003 [whole document]; pp. 771-783.

"Nedgty: Web Services Firewall"; Bebawy et al.; Proceedings of the IEEE International Conference on Web Services, 2005 (ICWS 2005) Jul. 15, 2005 [Section 3], [Section 4], pp. 5 pages.

* cited by examiner (a)

(b)

RICH WEB APPLICATION INPUT VALIDATION

FIELD OF INVENTION

The present invention relates to Web applications. More specifically, the present invention relates to Web application security

BACKGROUND OF THE INVENTION

The Internet is by far the largest, most extensive publicly available network of interconnected computer networks that transmit data by packet switching using a standardized Internet Protocol (IP) and many other protocols. The Internet has become an extremely popular source of virtually all kinds of information. Increasingly sophisticated computers, software, and networking technology have made Internet access relatively straightforward for end users. Applications such as electronic mail, online chat and web client allow the users to access and exchange information almost instantaneously.

The World Wide Web (WWW) is one of the most popular means used for retrieving information over the Internet. The WWW can cope with many types of data which may be stored on computers, and is used with an Internet connection and a Web client. The WWW is made up of millions of interconnected pages or documents which can be displayed on a computer or other interface. Each page may have connections to other pages which may be stored on any computer connected to the Internet. Uniform Resource Identifiers (URI) is an identifying system in WWW, and typically consists of three parts: the transfer format (also known as the protocol type), the host name of the machine which holds the file (may also be referred to as the web server name) and the path name to the file. URIs are also referred as Universal Resource Locators (URLs). The transfer format for standard web pages is Hypertext Transfer Protocol (HTTP). Hyper Text Markup Language (HTML) is a method of encoding the information so it can be displayed on a variety of devices.

Web applications are engines that create Web pages from application logic, stored data, and user input. Web applications often preserve user session state. Web applications make use of standard Web browser components to view server-side built pages. Web application can also deliver services through programmatic interface like Software Development Kits (SDKs).

HTTP is the underlying transactional protocol for transferring files (text, graphic images, sound, video, and other multimedia files) between web clients and servers. HTTP defines how messages are formatted and transmitted, and what actions web servers and web client browsers should take in response to various commands. A web browser as an HTTP client, typically initiates a request by establishing a TCP/IP connection to a particular port on a remote host. An HTTP server monitoring that port waits for the client to send a request string. Upon receiving the request string (and message, if any), the server may complete the protocol by sending back a response string, and a message of its own, in the form of the requested file, an error message, or any other information. Web pages regularly reference to pages on other servers, whose selection will elicit additional transfer requests. When the browser user enters file requests by either "opening" a web file by typing in a Uniform Resource Locator (URL), or clicking on a hypertext link, the browser builds an HTTP request. In actual applications, web clients may need to be distinguished and authenticated, or a session which holds a state across a plurality of HTTP protocols may need to be maintained by using "state" called cookie.

Web applications process HTTP request from users. The processing of HTTP requests by a Web application, involves handling user data within the Web application and performing operations on it. Because of the nature of computer systems, processing user data within a Web application can result in a break of the normal behavior of the computer system. Some of the computer system breaks can be exploited to trigger functionality outside of the Web application, or to make the Web application perform operations that a user is not entitled. A well-known computer system break, often exploited by malicious users, is buffer overflows. A buffer overflow occurs when data allows a user to run instructions of a computer that are outside the scope of the application he is using. Buffer overflows can give malicious users control of the computer system in which a Web application is running. The buffer overflow attack can be prevented if the incoming data is examined to ensure that it does not exceed a given size. On the other hand, failing to examine incoming data by a Web application can become an attack vector for malicious users. More information on these types of attacks may be found in the following articles from CERT®: "Understanding Malicious Content Mitigation for Web Developers", CERT Coordination Center, February 2000, http://www.cert.org/tech_tips/m-alicious_code_mitigation.html and http://www.cert.org/tech_tips/malicious_-code_FAQ.html; and "Malicious HTML Tags Embedded in Client Web Requests", CERT Coordination Center, February 2000, http://www.cert.org/advisories/CA-20-00-02.html), both documents are hereby incorporated by reference in their entirety.

There are various network level firewall technologies available, such as intrusion detection systems, to protect computer systems against malicious data. These firewalls use state tables and data patterns to filter network input. Because they are independent of Web applications and their validation capabilities are specialized for the network layer, they are generally inadequate to address the custom validation needs of complex Web applications.

A common strategy for protecting Web applications against malicious data is for Web applications to verify the data they receive prior to processing it. The act of checking data entering a Web application for processing is called input validation. Input validation consists of accepting only data deemed acceptable to a Web application, or rejecting data that could be offensive to the Web application. So as to not reject legitimate data, the input validation process requires a great deal of knowledge about the application behavior. However, software developers tend to be focused on producing functional code rather than input verification code. The result may be inconsistency in performing input validation tasks in various applications.

In addition, application software developers may not be well positioned to write their code so that it filters incoming data to ensure that such data is valid and legal. It may be unrealistic to expect the developers to know every possible form of attacks. Furthermore, new attacks lead to new requirements for input validation. Therefore, it is prudent practice to have a mechanism for performing additional validation checks in addition to the internal checks.

Some Web application frameworks offer input validation capabilities. For example, the Apache STRUTS Web application validation framework. The STRUTS framework uses a list of input validation rules.

Web applications can perform input validation themselves either in a centralized location or where the data is used. In this scenario, the input validation rules are embedded within the Web application. Examples of the validation capabilities offered in prior art validation engines are summarized by the STRUTS validation documentation at http://struts.apache.org/userGuide/dev_validator.html, which is incorporated by reference in its entirety. Example for STRUTS are: "required", used for mandatory field validation; "requiredif", a field dependant validator; "validwhen", a validator for checking one field against another; "minlength", is used to validate input data isn't less than a specified minimum length; "maxlength", is used to validate input data doesn't exceed a specified maximum length; "mask", is used to validate format according to a regular expression; "byte" is used to validate that a field can be converted to a byte; "short", used to validates that a field can be converted to a Short; "integer" is used to validates that a field can be converted to an Integer; "long", validates that a field can be converted to a Long; "float", validates that a field can be converted to a Float; "double" validates that a field can be converted to a Double; "date" validates that a field can be converted to a Date; "intRange" validates that an integer field is within a specified range; "floatRange" validates that a float field is within a specified range; "creditCard" is used to validate credit card number format; "email" is used to validate email address format; and "url" validates url format.

Although not an exhaustive list, above list reflects the validation capabilities available in validation engines. Custom validation code needs to be written if the validation needed is not provided by existing capabilities.

The advantage for using built-in validation capabilities from the validation engine instead of custom validation for parameters is the effectiveness to build large set of rules. Conversely, using custom validation would require duplicated validation logic for the Web application parameters to be validated, which may be numbered in thousands for a typical business Web application. In addition, Web application data values can change over the life of a Web application.

Therefore, a common difficulty encountered when writing validation rules for a Web application is that complex application data values often do not fall within the constraints of the current type based or regular expression rules, for example, as listed in the STRUTS framework. New security requirements also call for unusual validation outside the scope of traditional rule capabilities. To overcome this problem, custom code (for example in Javascript, C++, or Java) may be needed to validate values which cannot be handled by the existing validation engine capabilities. Writing and maintaining custom validation code is not efficient. Since Web application data validation logic is repetitive, the advantage of pre-defined rule types may be lost. Custom validation require a greater level of expertise from the rules writer (knowledge of code programming).

Another disadvantage of code driven rules is that once an application is deployed in an environment, policies will often prevent modifications to the installed code.

US Application 20030037236 teaches a technology for automated input validation filters generation to allow a user external to the Web application to easily define validation filters.

US Application 20030037236 does not teach the broadening of the validation capabilities of the input engine to perform additional validation. In addition, the relations used in defining assumptions on parameters follow the traditional input validation model as described by the list of validation types in the STRUTS framework. The inclusion of conjunctions and disjunctions is not sufficient to create the validation rules. Capabilities to ease manual writing of rules are introduced as manual writing of rules is undesirable. US Application 20030037236 does not give the rule writers with intimate knowledge of the Web application who seek to achieve the most secure validation the capabilities to address complex Web applications validation requirements as encountered in Business Intelligence Web applications.

US Application 20040189708 teaches a system and method validating entry of data into a structured data file in real-time. The system and method also described a real-time validation tool that enables a developer to create custom validation rules. These custom validation rules can include preset validation rules. The system and method validates data as to be safely stored in hierarchical structures thus easing the user experience by not generating misleading errors. However, US Application 20040189708 does not introduce new validation capabilities to validate input data against malicious users trying to exploit security vulnerabilities, it only provides a list of preset validation rules matching a sub-set of the STRUTs framework list. These preset validation rules and the custom rules failed to address the validation requirements of complex Web Applications like business intelligence Web applications. Furthermore, an objective of US Application 20040189708 is to report details about validation failures to the user which would be useful to a malicious user.

Therefore, there is a need for a richer and yet simple to define rules applied by a validation engine. The rules capabilities allow tight validation of complex Web application data without the need for customized validation code. There is a need for the rules syntax to be adapted for human handling, either by using human readable rule definitions, or by manipulating a tool. There is a need for the rules syntax to help write, to verify correctness, to ensure completeness, and to facilitate updates of the rules. There is a need for a prompt fix when a security vulnerability is newly discovered, a rules upgrade is preferable than a code upgrade. The update of validation rules is flexible and quick to implement.

SUMMARY OF THE INVENTION

According to one aspect of the present invention there is provided a method for validating a request to an application, the request having a data comprising the steps of: creating a validation engine comprising a validation logic, said validation logic comprising a rich validation rule, said rich validation rule using a plurality of ordered validation rule primitives (VRPs), said plurality of VRPs being selected from a group consisting of an acceptance VRP, a rejection VRP, and a combination thereof; loading said rich validation rule; applying said rich validation rule to the data, whereby the data is accepted if at least one of said acceptance VRPs succeeds and all of said rejection VRPs fail; and sending the request to the application.

According to another aspect of the present invention there is provided a method for validating a request to an application, the request having a data comprising the steps of: creating a validation engine comprising a validation logic, said validation logic comprising a validation rule, said validation rule corresponding to a defined plurality of data elements; loading said validation rule; applying said validation rule to said data elements; and sending said request to the application.

According to another aspect of the present invention there is provided a storage medium readable by a computer encoding a computer program for execution by the computer to carry out a method for validating a request to an application, the computer program comprising: code means for creating a validation engine comprising a validation logic, said validation logic comprising a rich-validation rule, said rich validation rule using a plurality of ordered validation rule primitives (VRPs), said plurality of VRPs being selected from a group consisting of an acceptance VRP, a rejection VRP, and a combination thereof; code means for loading said rich validation rule; code means for applying said rich validation rule to the data, whereby the data is accepted if at least one of said acceptance VRPs succeeds and all of said rejection VRPs fail; and code means for sending the request to the application.

According to another aspect of the present invention there is provided a storage medium readable by a computer encoding a computer program for execution by the computer to carry out a method for validating a request to an application, the computer program comprising: code means for creating a validation engine comprising a validation logic, said validation logic comprising a validation rule, said validation rule corresponding to a defined plurality of data elements; code means for loading said validation rule; code means for applying said validation rule to the data; and code means for sending said request to the application.

BRIEF DESCRIPTION OF THE DRAWINGS

These and other features of the invention will become more apparent from the following description in which reference is made to the appended drawings wherein.

DETAILED DESCRIPTION OF A PREFERRED EMBODIMENT

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
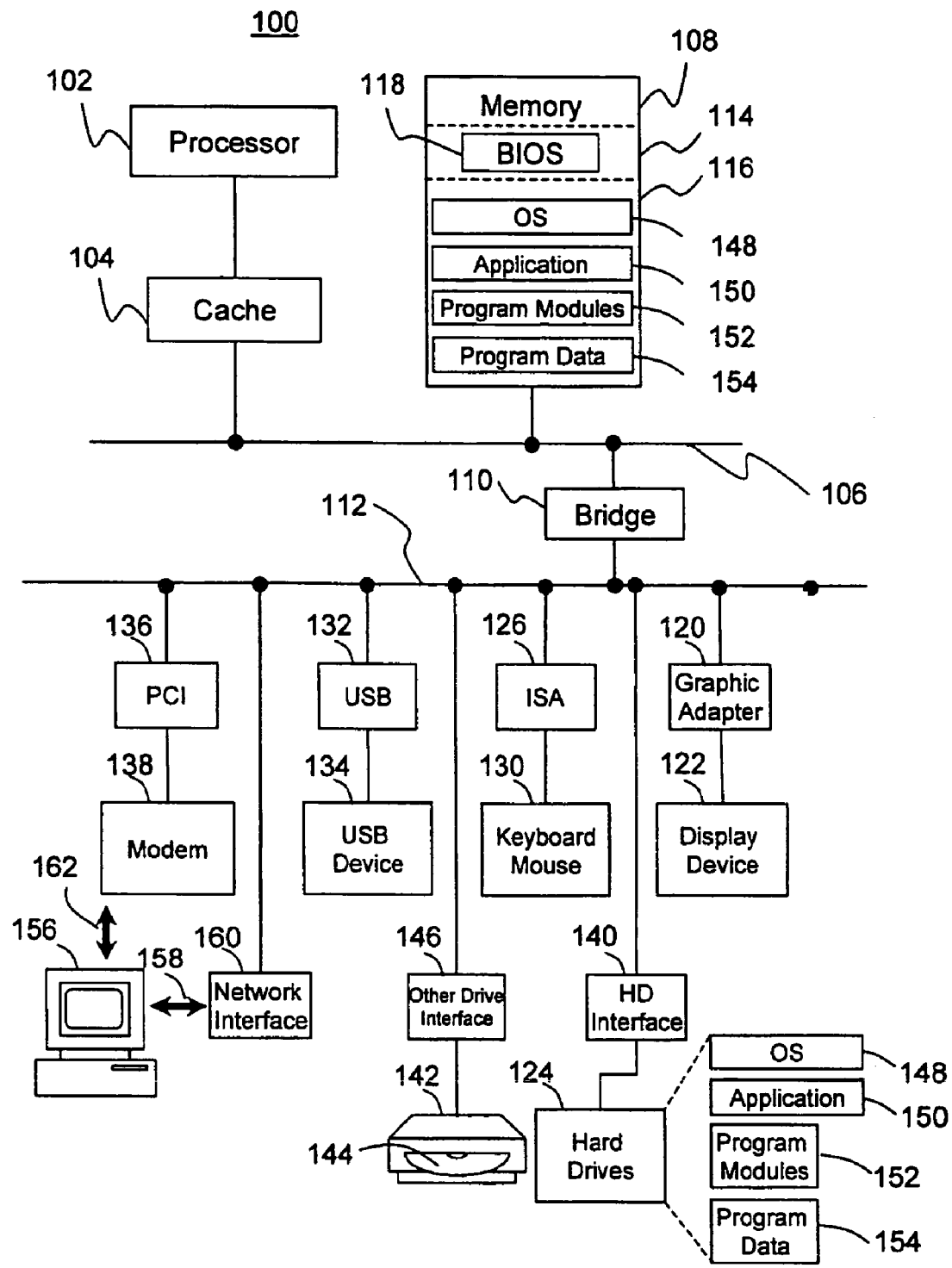
FIG. 1 shows a generic computing environment in which the present invention may be implemented.

FIG. 1 and the following discussion are intended to provide a brief general description FIG. 1 illustrates a block diagram of a suitable computing environment in which a preferred embodiment of the present invention may be implemented.

Those skilled in the art will appreciate that the invention may be practiced with many computer system configurations, including personal computers, hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Although not required, the invention will be described in the general context of computer-executable instructions, such as program modules, being executed by a personal computer. Generally, program modules include routines, programs, objects, components, data structures and the like that perform particular tasks or implement particular abstract data types.

With reference to FIG. 1 an exemplary system 100 for implementing the invention may be, for example, one of the general purpose computers. The system 100 includes processor 102, which in the exemplary embodiment are each connected to cache memory 104, the cache 104 is connected in turn to a system bus 106 that couples various system components.

Also connected to system bus 106 are a system memory 108 and a host bridge 110. Host bridge 110 connects I/O bus 112 to system bus 106, relaying and/or transforming data transactions from one bus to the other. The system bus 106 and the I/O bus 112 may be any of several types of bus structures including a memory bus or memory controller, a peripheral bus, and a local bus using any of a variety of bus architectures. The system memory includes read-only memory (ROM) 114 and random access memory (RAM) 116. A basic input/output system 118 (BIOS), containing the basic routines that help to transfer information between elements within the personal computer 100, such as during start-up, is stored in ROM 114.

In the exemplary embodiment, the system 100 may further include a graphics adapter 120 connected to I/O bus 112, receiving user interface information for display device 122. A user may enter commands and information into the system 100 through input devices 130 such as a conventional mouse, a key board 130, or the like. Other input devices 134 may include a microphone, joystick, game pad, satellite dish, scanner or the like. The devices may be connected via an Industry Standard Architecture (ISA) bridge 126, or a Universal Serial Bus (USB) bridge 132 to I/O bus 112, respectively. PCI device such as a modem 138 may be connected to the I/O bus 112 via PCI bridge 136.

The exemplary system 100 may further include a hard disk drive 124 for reading from and writing to a hard disk, connected to the I/O bus via a hard disk interface 140, and an optical disk drive 142 for reading from or writing to a removable optical disk 144 such as a CD-ROM or other optical media. The hard disk drive 124, magnetic disk drive 28, and optical disk drive 142 may be connected to the I/O bus 112 by a hard disk drive interface 140, and an optical drive interface 146, respectively. The drives and their associated computer-readable media provide non-volatile storage of computer readable instructions, data structures, program modules and other data for the system 100. Although the exemplary environment described herein employs a hard disk 124 and a removable optical disk 144, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk 124, optical disk 144, ROM 118 or RAM 116, including an operating system 148, one or more application programs 150, other program modules 152 and program data 154.

The exemplary system 100 may operate in a networked environment using logical connections to one or more remote computers, such as a remote computer 156. The remote computer 156 may be another personal computer, a server, a router, a network PC, a peer device or other common network node, and typically includes many or all of the elements described above relative to the exemplary system 100. The logical connections depicted in FIG. 1 include a network 158, for example, a local area network (LAN) or a wide area network (WAN). Such networking environments are commonplace in offices, enterprise-wide computer networks, Intranets and the Internet.

When used in a networking environment, the exemplary system 100 is connected to the local network 158 through a network interface or adapter 160. The exemplary system 100 may use the modem 138 or other means for establishing communications 162 over a wide area network such as the Internet. In a networked environment, program modules depicted relative to the exemplary system 100, or portions thereof, may be stored in the remote memory storage device. It will be appreciated that the network connections shown are exemplary and other means of establishing a communications link between the computers may be used.

The exemplary embodiment shown in FIG. 1 is provided solely for the purposes of explaining the invention and those skilled in the art will recognize that numerous variations are possible, both in form and function. For instance, the exemplary system 100 may also include a magnetic disc drive, and numerous other optional components. All such variations are believed to be within the spirit and scope of the present invention. The exemplary system 100 and the exemplary figures below are provided solely as examples for the purposes of explanation and are not intended to imply architectural limitations. In fact, this method and system can be easily adapted for use on any programmable computer system, or network of systems, on which software applications can be executed.

Figure 2:
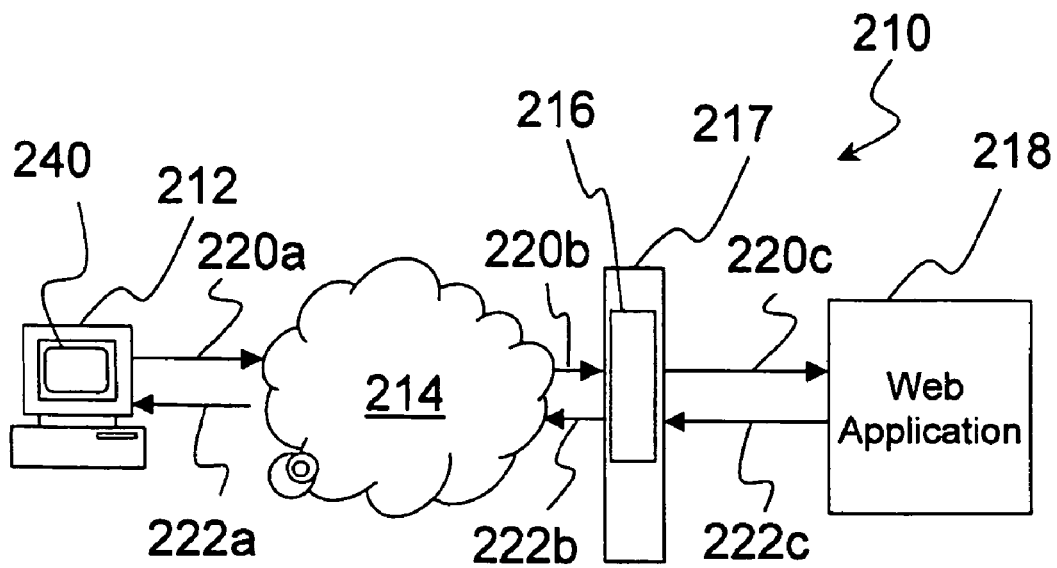
FIG. 2 shows a generic overview of a web application environment.

FIG. 2 provides an overview of a network 210 with an application firewall 216 separating the Web application 218 with the client browser 240 on a computer 212 over a public network 214 such as Internet. The web server 217 generally monitors the requests 220 from a web browser 240 to a web application 218. The web server 217 may include a firewall 216. One example of the web applications 218 is a business reporting engine (RE).

Figure 3:
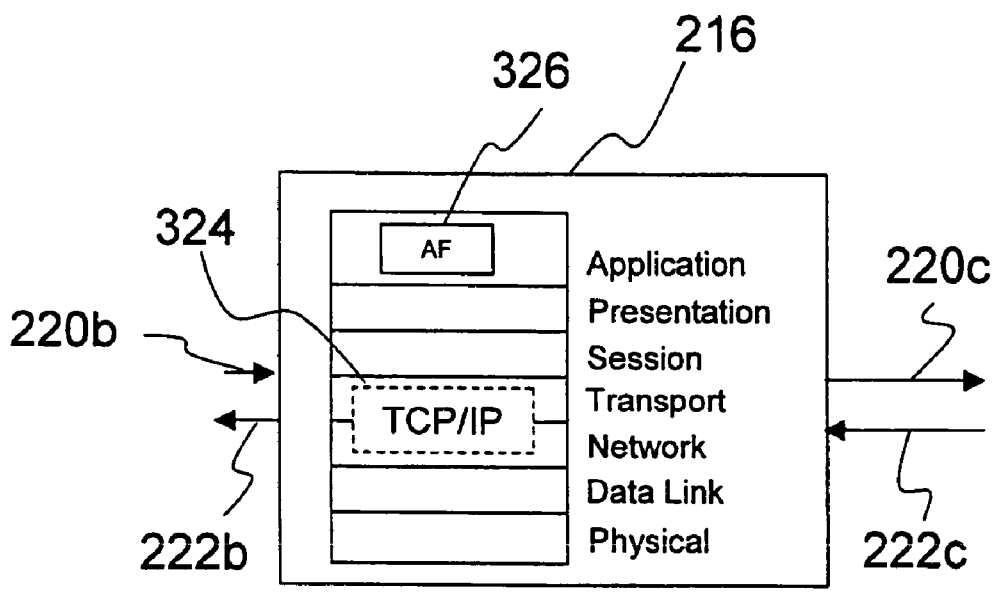
FIG. 3 shows examples of firewalls in relation to the OSI model.

Referring to FIG. 3, one type of firewalls is the network layer firewall 324 operating at the TCP/IP protocol stack as IP-packet filters, allowing packets to pass through the firewall only when they match the rules. The rules could be defined by the user; or by default. Network firewalls exist in most computer operating system and network appliances. Network firewalls deal with the numerous possible combinations that are to be allowed and forbidden at the transmission control protocol (TCP) and Internet protocol (IP) level. Another type of firewall is an application layer firewall 326 operating at the application layer of a protocol stack. It may be a host using a proxy server or gateway, or a module embedded within an application. The purpose of an application firewall is to proxy traffic instead of routing it. As it works at the application layer, it may be configured to inspect the contents of the traffic, blocking what the firewall administrator views as inappropriate content, such as invalid request or attempts to exploit logical flaws in the application. The application firewall may be configured by a set of predetermined rules that are read at the time of startup. The present invention is directed to rich Web application input validation in an application firewall using validation rules.

Input validation for Web applications may be performed by an application firewall. Referring to FIG. 2, an application firewall has access to the traffic coming into and sometimes out of the Web application. The application firewall input validation behavior may be specified in the form of a list of rules to be applied on input data. The advantage for using rules without custom validation is the effectiveness to build large set of rules, thus avoid the duplication of the validation logic for thousands of parameters in a typical business Web application. The predefined rules list can also easily adapted to Web application data values which can change over the life of a Web application.

Figure 4:
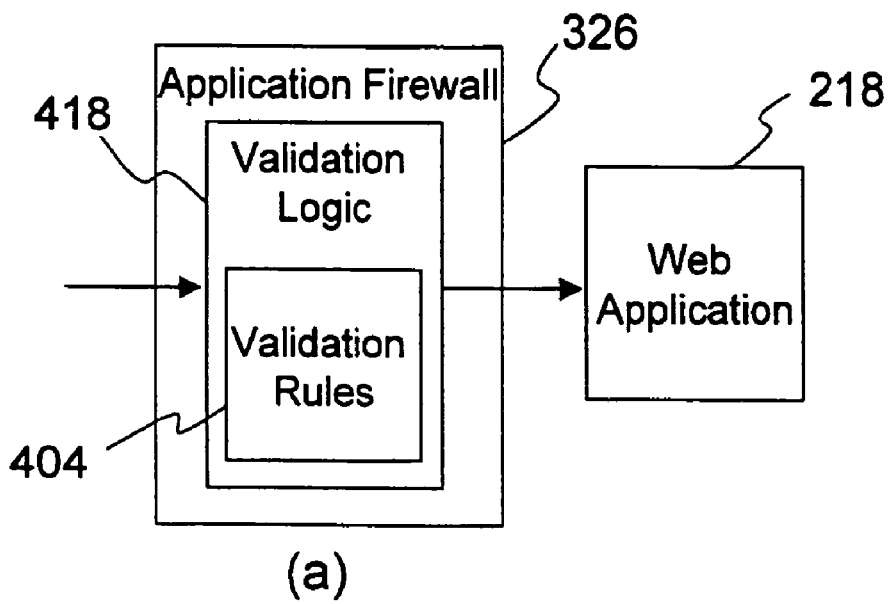
FIG. 4(a) is an example of a validation engine based on rules list.
FIG. 4(b) shows an example of validation rules in groups.
Figure 4:
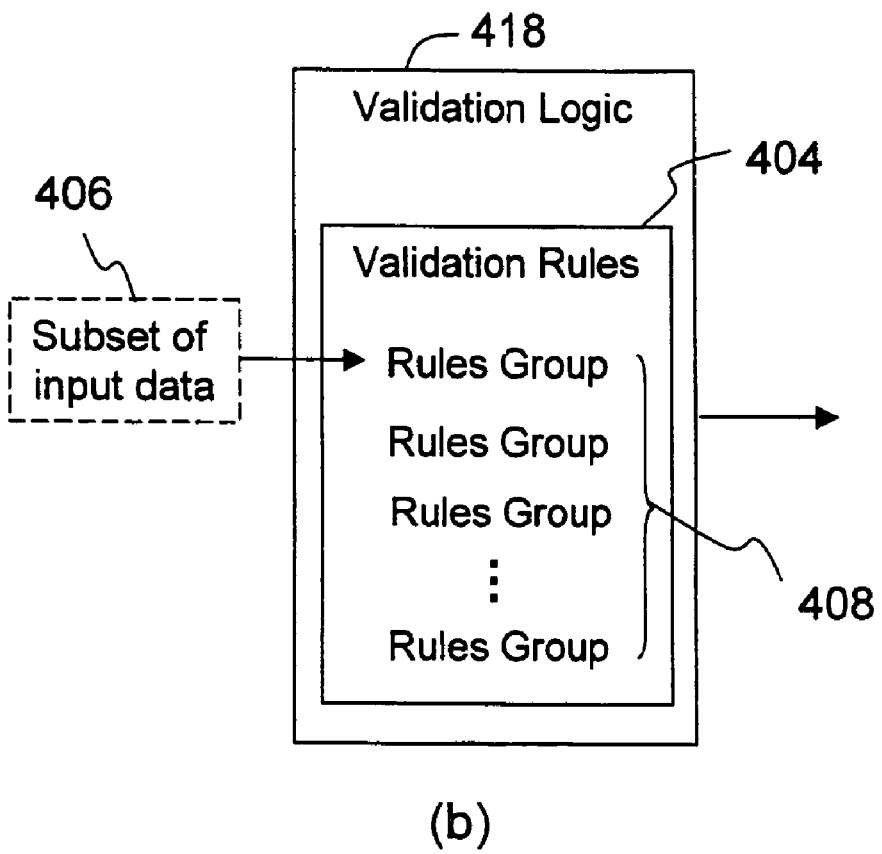

Referring to FIG. 4(*a*), validation engine 402 based on rules list 404 can easily adapt to changes. A validation rule ties part of the request input data to an input validation logic. For example, a validation rule can require the parameter "isgoodcustomer" to have the value "true" or "false". Completeness is achieved when all data received in requests is covered by rules. Correctness is achieved when only safe data reaches the Web application. A validation logic in a validation engine may be customized by a particular Web application.

Referring to FIG. 4(*b*), the rules 404 are maintained in groups. A group of rules is associated with a sub-set of the possible input data 406. To simplify the description of the input validation capabilities below, the sum of all groups of rules will be referenced as the rules list 408.

The syntax used to define rules is XML. The syntax is designed to be readable by a human with minimal tool assistance.

Figure 5:
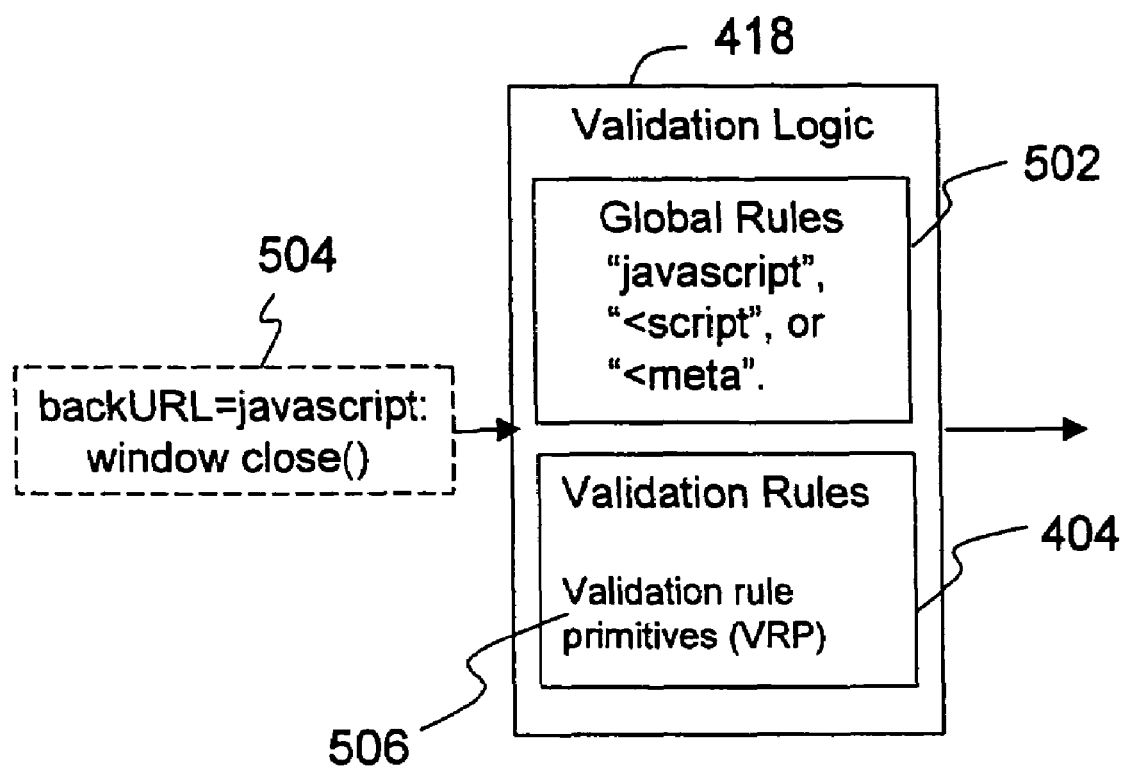
FIG. 5 illustrates an example of a validation rule primitives with acceptance and rejections.

Referring to FIG. 5, an example of data which is difficult to validate even by using custom code, is a request parameter that contains a sub-value considered invalid as part of a global rejection rule but still valid for that parameter. A global rejection rule 502 rejecting any parameter values containing "javascript", "<script>", or "<meta" is defined. However, a parameter 504 for which the value "backURL=javascript: window.close( )" is valid. If the global rejection rule 502 is applied on the value of 504, it will reject it because it contains the sub-value "javascript". Completely skipping the global rule for the parameter 504 is not a proper solution since other undesired elements of rule 502, for example "<script", could be used in parameter 504. A better solution is to remove the acceptable sub-value "javascript:window.close( )" from the parameter and let the global rule 502 be applied.

Validation rule primitives (VRP) define data to be accepted or rejected in rules. A rejection VRP is defined using the reject attribute set to true. Acceptance VRP is the default. There are three types of VRPs: built-in, custom function, and Perl regular expression.

Xpath expressions may be used to identify which data in an XML request a rule is applied to. Xpath is a terse (non-XML) syntax for addressing portions of an XML document.

As described in FIG. 4(*a*), similar to other validation engines, validation logic 418 may be residing in the application firewall 326. Validation logic residing inside the application firewall is referred as built-in VRP. A list of the built-in acceptance VRPs includes: integer, unsigned integer, boolean, URL location, and searchpath which is defined as a path to an item in the Web application content store. Two built-in rejection VRPs are: maximum length, and minimum length. These two built-in rejection VRPs reject data if its length is outside the specified boundary.

The input data validated by a rule may be specified by a parameter name in the request. Using one or more VRPs, a rule may specify the acceptable and un-acceptable values for the corresponding parameter name. For example, a rule defined for the name "hours" will validate the value of the parameter named "hours" in requests. Example of a rule for the parameter name "hours" that enforces the built-in VRP unsigned integer ("uint") is as follows:

```
<parameter name="hours" type="uint"/>
```

Example of a rule for the parameter name "state" using a regular expression VRP allowing one of "green", "red", or "yellow" is as follows:

```
<parameter name="state">
    <pattern value="^(green|red|yellow)$"/>
</parameter>
```

A regular expression VRP may be re-used in multiple rules by assigning a name to it. Rules may then reference the named VRP. Example of a VRP definition named "vrp_action" with a regular expression checking for either a value of "overwrite" or "rename" is as follows:

```
<patterndef name="vrp_action" value="^(overwrite|rename)$"/>
```

Example for a rule "action" using the VRP "vrp_action" through a name reference is as follows:

```
<parameter name="action">
    <patternref name="vrp_action"/>
</parameter>
```

The result of these two definitions is that values of the "action" parameter must match either "overwrite" or "rename".

A global rejection rule using a named VRP "invalidstrings" applies to all parameters by default. This global rule can be overridden at the rule level with the attribute "skipglobalrule". Example of the global rule definition that applies to all parameter names and values is as follows:

```
<globalrule name="globalrule">
    <patternref name="invalidstrings" reject="true"/>
</globalrule>
```

Example of a definition for the "invalidstrings" VRP of the global rejection rule is as follows:

```
<patterndef name="invalidstrings"
value="(?i)(</?form\b|</?script\b|<embed\b|</?object\
b|<applet\b|<meta\b|\bonevent\b|\bonsubmit\b|\
bonload\b|\bonmouse\b|<iframe\b|<frameset\b|\bjavascript\
b|\bexpression\( )"/>
```

The global rejection rule contains a list of well-known sub-values used in security exploits.

Example of disabling the global rejection rule for a parameter rule using the "skipglobalrule" attribute is as follows:

```
<parameter name="state" skipglobalrule="true">
    <pattern value="^(green|red|yellow)$"/>
</parameter>
```

The global rejection rule does not need to be checked for the "state" parameter because only "green", "red", and "yellow" are allowed. Skipping the global rejection rule improves performance.

Application firewall's existing logic can be customized by modifying well-known named VRPs in the rules list.

Example of the "type_bool" named VRP used by the built-in VRP "bool" logic is as follows:

```
<patterndef name="type_bool" value="^(false|true)$"/>
```

Example of a usage of the built-in VRP bool is as follows:

```
<parameter name="allow_duplicates" type="bool"/>
```

A built-in application firewall global character rejection rule rejects a set of well-known unsafe characters in all parameters names and values. The invalid characters are character values smaller than 0x20 except for 0x09 (tab), 0x0a (new line), and 0x0d (carriage return). The global character rejection rule can be overridden at the rule level by specifying a list of valid characters using the "validchars" attribute.

For example of the parameter "spec" that accepts the character 0x07 even if it gets rejected by the global character rejection rule is as follows:

```
<parameter name="spec" maxlen="1048576" validchars=""/>
```

Figure 6:
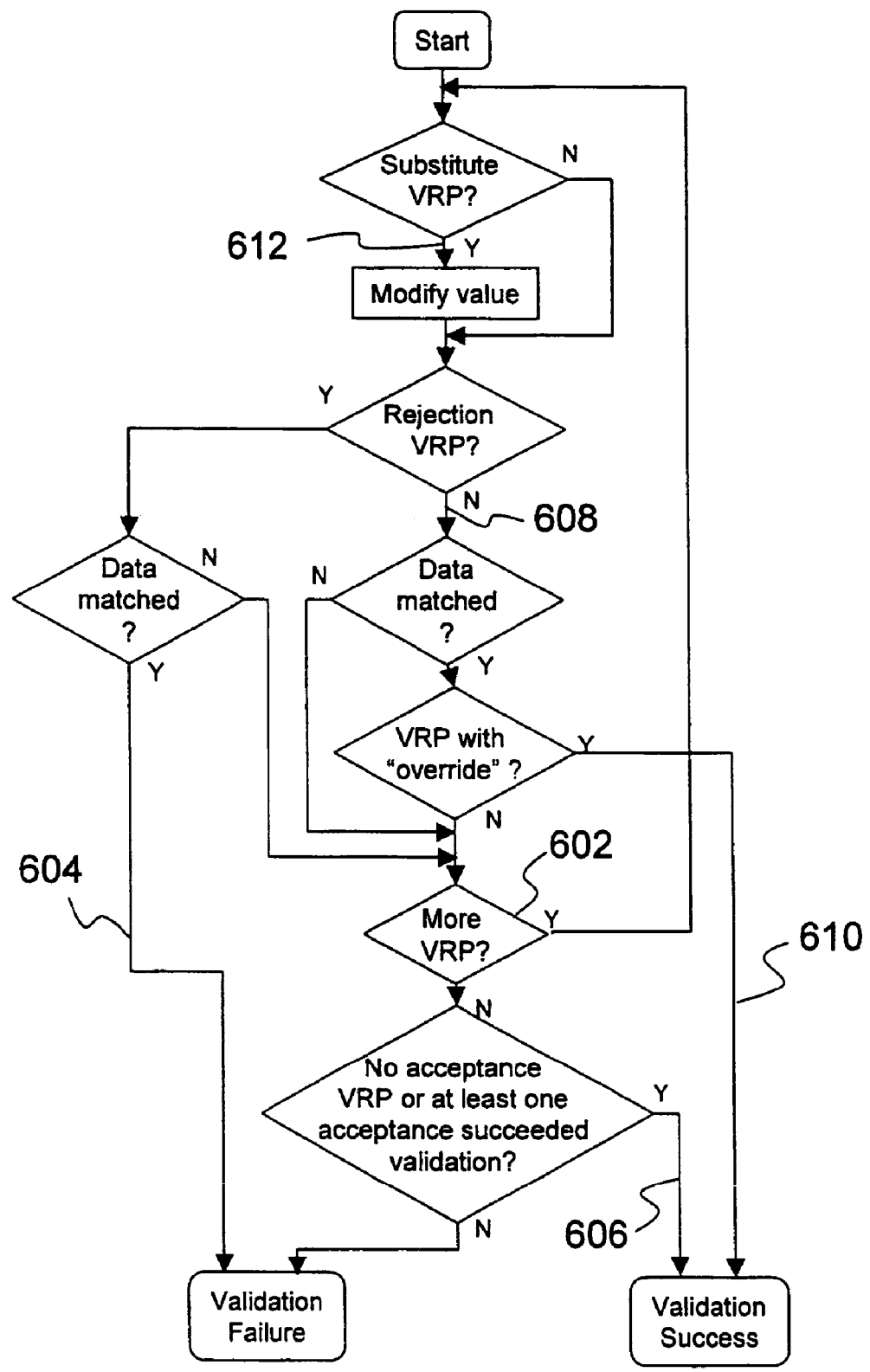
FIG. 6 is a flow diagram showing an example of the present invention.

Referring to FIG. 6, a rule may have multiple VRPs 602. A rule without acceptance VRPs results in successful validation of the data. If a rule has acceptance VRPs at least one acceptance VRP must validate the data successfully for the rule to be successful. 606 A rule fails if any of its rejection VRP succeeds. VRPs are processed in the order they appear in the rule definition. If an "override" attribute is set to true for an acceptance regular expression VRP, validation stops if a match occurs 610. When an acceptance override VRP causes validation to stop, VRPs following the VRP causing the stop are ignored. A regular expression VRP with the "substitute" attribute set to true will modify 612 the data being validated instead of performing validation. The first matched subexpression ($1) of the substitute regular expression VRP is removed. VRPs that follow a substitute VRP validate the modified data.

Example of a rule using multiple VRPs is as follows:

```
<parameter name="action" maxlen="1024">
    <pattern value="^action.*$"/>
    <patternref name="dangerousactions" reject="true"/>
</parameter>
```

A value for action is valid if starting with the string "action" and not longer than 1024 characters except if the "dangerousactions" named VRP matches.

Example of a rule using a built-in VRP type int, an acceptance regular expression VRP, and a rejection regular expression VRP is as follows:

```
<parameter name="doubleusage" type="int">
    <pattern value="^(cat|dog|bird)$"/>
    <pattern value="^0$" reject="true"/>
</parameter>
```

The value for parameter "doubleusage" is valid if it is an integer not 0 or if in the enumeration "cat", "dog", or "bird".

The validation engine can be augmented using custom function VRPs. These custom function VRPs are named validation logic referenced with the "customfunction" attribute. The custom function VRPs are made available to the validation engine as external code modules. The code of custom function VRPs can invoke the application firewall to make use of named VRPs.

Example of a report parameter validated by a Java code function called reportspecification is as follows:

```
<parameter name="report" customfunction="reportspecification"/>
```

To apply a single rule to multiple parameter names, a Perl regular expression can be used to match parameter names. The set of names from the regular expression is given in a name. The regular expression name is then assigned to a rule using a reference to define the set of parameter names validated.

Example of the definition of a set of parameter names "dynamic_admin_names" is as follows:

```
<patterndef name="dynamic_admin_names"
    value="^rule_(package|user|server_group) $"/>
```

Example of a rule definition for the "dynamic_admin_names" set of names is as follows:

```
<dynparameter name="dynamic_admin_rule" maxlen="1024"/>
```

The rule sets the maximum length for parameter names starting with "rule_" and followed by either "package", "user", or "server_group" to 1024 characters.

Rules can be specified for other request data types other than parameters.

Example of a rule for a cookie name "usertoken" for which values must be between 40 and 56 characters long is as follows:

```
<cookie name="usertoken" minlen="40" maxlen="56"/>
```

Example of a rule for "item" XML elements validated using a custom function "reportspecification" and having a maximum length of 1048576 characters is as follows:

```
<xmlrule xpath="/*[local-name( )='Envelope']/*[local-name( ) =
'Body']/*[local-name( )='editAnalysisSpecification']/*[local-name( )=
'specification']/*[local-name( )='value']/*[local-name( )=
'item']" maxlen="1048576"
customfunction="reportspecification"/>
```

Example of a rule that checks values for minimum length of 3, maximum length of 15, skips the global rule, and require a postal code format match is as follows:

```
<parameter name="postalcode" minlen="3" maxlen=
    "15" skipglobalrule="true">
    <patternref name="postalcode"/>
</parameter>
```

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). Further, a computer data signal representing the software code which may be embedded in a carrier wave may be transmitted via a communication network. Such a computer readable memory and a computer data signal are also within the scope of the present invention, as well as the hardware, software and the combination thereof.

The present invention has been described with regard to one or more embodiments. However, it will be apparent to persons skilled in the art that a number of variations and modifications can be made without departing from the scope of the invention as defined in the claims.

What is claimed is:

1. A method for validating a request to a Web application, the request having a data, the method comprising:
   creating a validation engine in a programmable processor, the validation engine comprising a validation logic, said validation logic comprising a rich validation rule, said rich validation rule using a plurality of ordered validation rule primitives (VRPs), said plurality of VRPs being selected from a group consisting of an acceptance VRP, a rejection VRP, and a combination thereof;
   loading said rich validation rule;
   applying said rich validation rule to the data, whereby the data is accepted if at least one of said acceptance VRPs succeeds and all of said rejection VRPs fail; and
   sending the request to the Web application.

2. A method for validating a request to a Web application, the request having a data comprising:
   creating a validation engine in a programmable processor, the validation engine comprising a validation logic, said validation logic comprising a validation rule, said validation rule corresponding to a defined plurality of data elements;
   loading said validation rule;
   applying said validation rule to said data elements; and
   sending said request to the Web application.

3. The method according to claim 1, wherein said validation engine resides in an application firewall.

4. The method according to claim 1, wherein said VRP is validation engine built-in validation logic, validation engine custom validation function, or Perl regular expression.

5. The method according to claim 4, wherein said built-in validation logic uses a well-known named VRP, wherein said built-in validation logic is further customized by modifying said named VRP.

6. The method according to claim 4, wherein said custom validation logic is added to said validation engine as an external code module.

7. The method according to claim 1, wherein said validation engine serves the Web application, and provides validation logic customized to the Web application.

8. The method according to claim 1, wherein said VRP is a list of characters.

9. The method according to claim 1, wherein said VRP is defined and referenced by name.

10. The method according to claim 1, wherein said VRP is flagged to override the logic of the VRPs that follows said VRP.

11. The method according to claim 1, wherein said VRP is used to modify the data used by VRPs that follows said VRP.

12. The method according to claim 1, wherein the Web application is an engine creating Web pages from application logic, stored data, and user input.

13. The method according to claim 2, wherein said plurality of data elements comprises parameter names of the request, said parameter names being associated with their value.

14. The method according to claim 2, wherein said plurality of data elements are Perl regular expression.

15. The method according to claim 13, wherein said validation rule is a global rejection rule applying to all parameter names and values.

16. The method according to claim 15, further comprising the step of overriding the global rejection rule by a second rule.

17. The method as claimed in claim 15, wherein the said global rejection rule comprises a list of well-known values and characters used in security exploits.

18. The method as claimed in claim 2, wherein an XPath expression is used to identify said plurality of data elements in an XML request.

19. The method according to claim 2, wherein said plurality of data elements are dynamically defined by communication between the Web application and an application firewall.

20. The method according to claim 2, wherein the Web application is an engine creating Web pages from application logic, stored data, and user input.

21. A storage device readable by a computer encoding a computer program for execution by the computer to carry out a method for validating a request to a Web application, the computer program comprising:
   code means for creating a validation engine comprising a validation logic, said validation logic comprising a rich validation rule, said rich validation rule using a plurality of ordered validation rule primitives (VRPs), said plurality of VRPs being selected from a group consisting of an acceptance VRP, a rejection VRP, and a combination thereof;
   code means for loading said rich validation rule;
   code means for applying said rich validation rule to the data, whereby the data is accepted if at least one of said acceptance VRPs succeeds and all of said rejection VRPs fail; and
   code means for sending the request to the Web application.

22. A storage device readable by a computer encoding a computer program for execution by the computer to carry out a method for validating a request to a Web application, the computer program comprising:
   code means for creating a validation engine comprising a validation logic, said validation logic comprising a validation rule, said validation rule corresponding to a defined plurality of data elements;
   code means for loading said validation rule;
   code means for applying said validation rule to the data; and
   code means for sending said request to the Web application.

23. The storage device according to claim 21, wherein said validation engine resides in an application firewall.

24. The storage device according to claim 21, wherein said VRP is validation engine built-in validation logic, validation engine custom validation function, or Perl regular expression.

25. The storage device according to claim 24, wherein said built-in validation logic uses a well-known named VRP, wherein said built-in validation logic is further customized by modifying said named VRP.

26. The storage device according to claim 24, wherein said custom validation logic is added to said validation engine as an external code module.

27. The storage device according to claim 22, wherein said plurality of data elements comprises parameter names of the request.

28. The storage device according to claim 22, wherein said plurality of data elements are Perl regular expression.

29. The storage device according to claim 27, wherein said validation rule is a global rejection rule applying to all parameter values.

30. The storage device according to claim 29, further comprising the step of overriding the global rejection rule by a second rule.

31. The storage device according to claim 29, wherein the said global rejection rule comprises a list of well-known values and characters used in security exploits.

* * * * *